United States Patent [19]

Von Kohorn

[11] Patent Number: 5,128,752
[45] Date of Patent: Jul. 7, 1992

[54] SYSTEM AND METHOD FOR GENERATING AND REDEEMING TOKENS

[76] Inventor: Henry Von Kohorn, 945 Treasure La., Vero Beach, Fla. 32963

[21] Appl. No.: 604,787

[22] Filed: Oct. 25, 1990

Related U.S. Application Data

[63] Continuation-in-part of Ser. No. 424,089, Oct. 19, 1989, which is a continuation-in-part of Ser. No. 192,355, May 10, 1988, Pat. No. 4,926,255, and a continuation-in-part of Ser. No. 192,248, May 10, 1988, Pat. No. 4,876,592, which is a continuation-in-part of Ser. No. 837,827, Mar. 10, 1986, Pat. No. 4,745,468.

[51] Int. Cl.⁵ ............................................. H04N 7/00
[52] U.S. Cl. .......................................... 358/84; 455/2; 364/405
[58] Field of Search ............... 455/2, 4; 358/84, 86; 364/405

[56] References Cited

U.S. PATENT DOCUMENTS

| 4,910,672 | 3/1990 | Off et al. ........................... 364/405 |
| 4,926,256 | 5/1990 | Nanba ................................... 455/2 |
| 4,949,256 | 8/1990 | Humble ............................. 364/405 |
| 4,972,504 | 11/1990 | Daniel, Jr. et al. .................... 455/2 |

*Primary Examiner*—Curtis Kuntz
*Attorney, Agent, or Firm*—Perman & Green

[57] ABSTRACT

Tokens and coupons are generated in a television viewer's home by the viewer entering selected product information and authentication data transmitted to and displayed on the television into a home generating unit. The tokens and coupons can be presented to stores or redemption facilities for prizes and discounts on selected products. The matrix used to record the product information and verification data may also be provided with a code for use in giving additional prizes to purchasers whose code matches a predetermined code. The generating unit may also comprise a memory for storing information regarding the coupons generated by the unit for later review by marketing and manufacturing companies.

40 Claims, 3 Drawing Sheets

SYSTEM AND METHOD FOR GENERATING AND REDEEMING TOKENS

CROSS-REFERENCE TO RELATED APPLICATIONS

The present application is a continuation-in-part of copending U.S. patent application Ser. No. 07/424,089 filed Oct. 19, 1989, which is a continuation-in-part application of U.S. Pat. Ser. No. 07/192,355 filed May 10, 1988, now U.S. Pat. No. 4,926,255, and U.S. patent Ser. No. 07/192,248 filed May 10, 1988, now U.S. Pat. No. 4,876,592, which are continuation-in-part applications of U.S. Pat. Ser. No. 06/837,827 filed Mar. 10, 1986, now U.S. Pat. No. 4,745,468.

BACKGROUND OF THE INVENTION

1. Field of the Invention

The present invention relates to generating and promoting redemption of tokens having value. More specifically, the present invention includes a system and method that permits the generating and dispensing of tokens, such as product discount coupons, specified by individual members of a broadcast audience in remote locations such as their homes, these individual members of the broadcast audience being potential shoppers or customers.

2. Prior Art

The current use of discount coupons has a serious drawback in that there is a substantially low rate of redemption of such coupons. Frequently there is only about a 2.5 to 4 percent redemption of the total number of coupons printed in newspapers, magazines, mailings, free-standing inserts, etc. This low rate of redemption significantly hinders the intended purpose of product coupons and the like; i.e.: to induce or encourage purchasers to buy a certain brand of product over other brands or, to encourage a potential purchaser to come to a specified seller's location rather than a competitor's location.

It is therefor a principal object of the present invention to raise the rate of redemption of prize or discount coupons and thus increase purchases of certain products, increase distribution of consideration to purchasers, and increase the volume of potential purchasers going to sellers' locations.

It is another object of the present invention to permit television viewers or radio listeners to specify a product or service from a variety of products and services and to dispense tokens, such as coupons carrying a discount on the specified product or services, at remote locations.

It is yet another object of the present invention to simplify the equipment required and method used for generating and dispensing coupons for promoting more frequent redemption than has been the case heretofore.

SUMMARY OF THE INVENTION

The foregoing problems are overcome and other advantages are provided by a system and method for selectively generating tokens at a remote location which can be redeemed at a redemption location for value consideration. The present invention thus allows the redemption rate of tokens, such as discount coupons, to be raised significantly if such value consideration is applicable to a product or service selected or targeted by audience members for purchase or retainment.

In accordance with one method of the present invention, a method for generating and redeeming tokens having value comprises the steps of transmitting electronic program signals having information regarding at least one product available for purchase from a central location to remote locations, the information including data regarding token redemption and value consideration available upon purchase of the product; receiving and presenting the signals at the remote locations; providing token generating units at the remote locations, the units comprising means for selectively entering the information, buffer storage means for storing selected information data, a matrix adapted to record selected entered information and data, and means for writing the stored information and data on the matrix; entering information regarding a product intended for purchase at the unit; storing the information in the generating unit; generating a token by writing information regarding the product and the token redemption data on the matrix; dispensing the token from the unit; the method further including the steps of providing a redemption facility for redeeming the token; presenting the token at the redemption facility; verifying compliance with redemption terms on the token at the reception facility; and making the consideration of an authenticated token available upon purchase of the product.

In accordance with one system of the present invention, a system for generating redeemable tokens having value at remote locations of members of a broadcast audience is provided. The system comprises broadcast means at a central location for transmitting electronic program signals having product information and token redemption information. Means are provided at the members locations for receiving and presenting the program signals. Token generating units are provided at the members locations, each unit comprising means operable by individual ones of the members for entering product information, a matrix adapted to record entered information and data thereon, token generating means for generating tokens, buffer storage means for storing entered product information, means for activating the generating means, and means for dispensing tokens, the token generating means includes means for recording product information and token redemption data on the matrix upon activation of the generating means. The system further comprises a token redemption facility for authenticating compliance with redemption terms and for making the value of a presented token available to the member upon purchase of a product.

In accordance with another method of the present invention a method of increasing the redemption rate of discount coupons is provided comprising generating a coupon from a generating unit at a remote location in response to a purchaser's selection of available coupons entered into the unit; providing the coupons with a code; giving value consideration to a purchaser upon redemption of a coupon; and giving additional value consideration to a purchaser upon the coupon code having a predetermined correlation with a predetermined code.

In accordance with another method of the present invention, a method for attracting shoppers to sales outlets is provided comprising the steps of transmitting electronic signals conveying a task-setting message from a central location to shoppers' remote locations; receiving the task-setting signals at shoppers' remote locations; entering a response to a task setting message by a shopper at one of the remote locations; formulating response criteria defining a prize winning response to a task; said response criteria including a period of time for entering a response in a basis for scoring a prize-winning response; transmitting electronic signals conveying response criteria from a central location to the shoppers' remote locations; receiving the response criteria signals at shoppers' remote locations; comparing shoppers' responses with the response criteria; identifying a shopper's prize-winning response meeting the response criteria; scoring a prize-winning response in accordance with the scoring basis; compiling at a central location information relative to products available to prize-winning shoppers at a sales outlet; transmitting electronic signals conveying the product information from a central location to shoppers' remote locations; receiving the product information signals at shoppers' remote locations; presenting the product information at shoppers' remote locations; selectively entering product information chosen from the available product information at one of said remote locations; generating a hard copy record bearing an indication of a scored prize and of a selected product, the prize being available to a prize-winning shopper upon purchase of the selected product at a sales outlet; and dispensing the record to a prize-winning shopper at one of the remote locations.

BRIEF DESCRIPTION OF THE DRAWINGS

The foregoing aspects and other features of the invention are explained in the following description, taken in connection with the accompanying drawings, wherein.

DETAILED DESCRIPTION OF THE INVENTION

To facilitate an understanding of the terms used herein, the following definitions are provided.

The terms "redeem" and "redemption" are intended to include the presentation, delivery, surrender or other form of turning in a token, in person, by mail, or otherwise, in exchange for merchandise, discounts, prizes, cash, vouchers or other consideration.

The term "token redemption data" is intended to include data specifying locations where tokens can be redeemed, dates or time limits during which tokens can be redeemed, and/or information to prevent fraud or cheating, such as verification data.

The term "consideration" is intended to include value whether monetary, commercial or symbolic.

The term "central" is intended to include a location or locations other than remote receiving locations such as a television transmission station or any transmitter serving an area of members of a broadcast audience.

The term "token" is intended to include hard copy records, coupons, certificates, magnetic cards and other records that can be redeemed.

The term "dispensing tokens" is intended to include the issuing, delivery or making available tokens to a member of the broadcast audience, whether mechanically or manually.

The term "matrix" is intended to include a substrate on which information may be provided, recorded or stored, for example electro-magnetically as in the case of magnetic cards, plastic film, or by printing as in the case of a paper matrix, etc.

The term "product information" is intended to include listings, specifications, prices, discounts and other information for a product or service including depiction by language or graphics.

The term "code" is intended to comprise alphanumeric and/or other indicia or symbols.

In the context of the present method the term "sponsor" is intended to include advertisers, broadcasters, sales outlets, manufacturers, and suppliers of goods and services.

Figure 1:
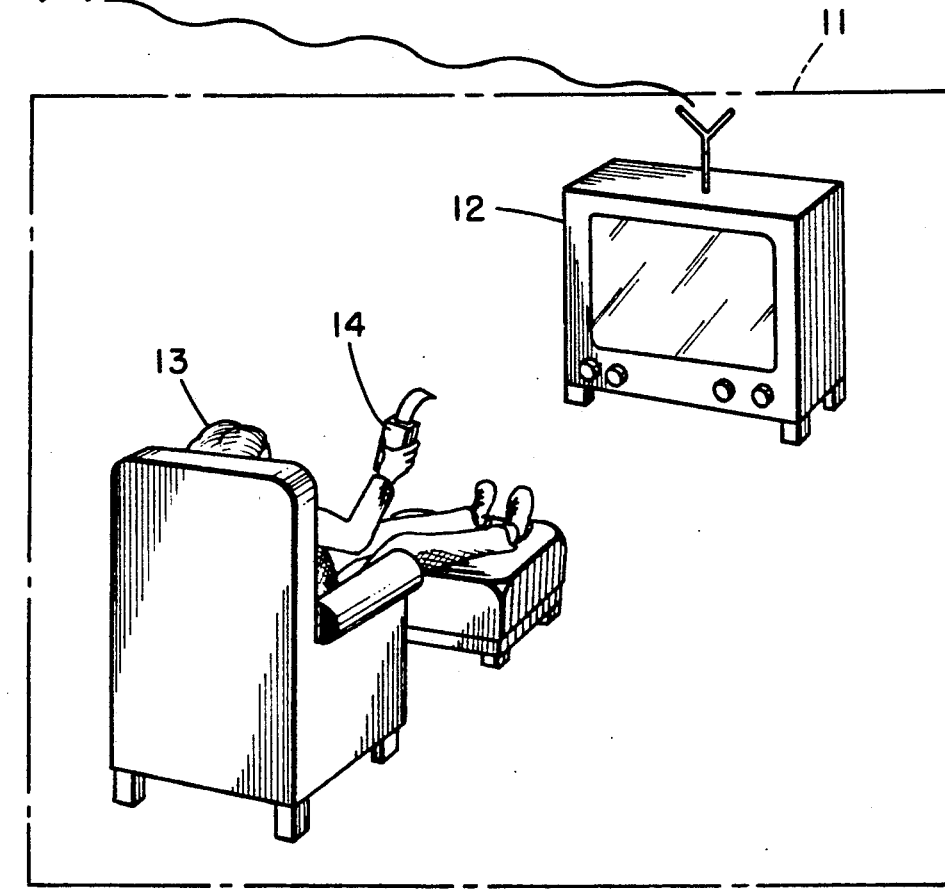
FIG. 1 is an illustrative view of a central station and remote location for use with the present invention.

Referring to FIG. 1, there is shown a diagrammatical view of a central transmitter 10 and remote location 11. Although the present invention will be described below with reference to a television broadcast, it should be understood that the invention is applicable to any type of broadcast including radio broadcast and closed circuit broadcasts. Generally, a television program is transmitted by standard broadcast facilities 10 and received at various remote locations 11 on standard television receivers 12. Receiver 12 can be any suitable type of receiver including a passive video display or a liquid crystal display. Viewers 13, which also constitute potential shoppers or customers, at the various remote locations 11 constitute a broadcast audience. The present invention includes providing generating units 14 at the remote locations 11 of the members 13 of the broadcast audience. Each generating unit 14 is intended to be self contained and individually operated by a viewer 13 to generate and dispense tokens or coupons 2 (See FIG. 3) to the viewer 13 in the convenience of the viewer's home.

Figure 3:
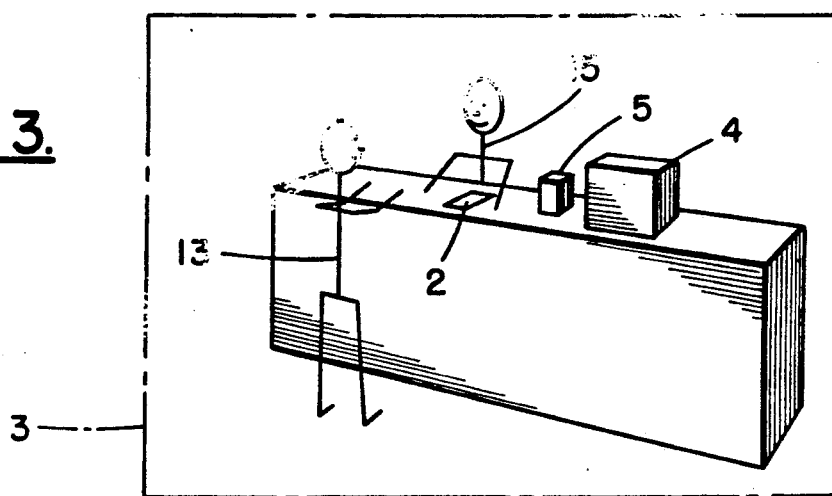
FIG. 3 is an illustrative view of a redemption center for use with a method of the present invention.
Figure 2:
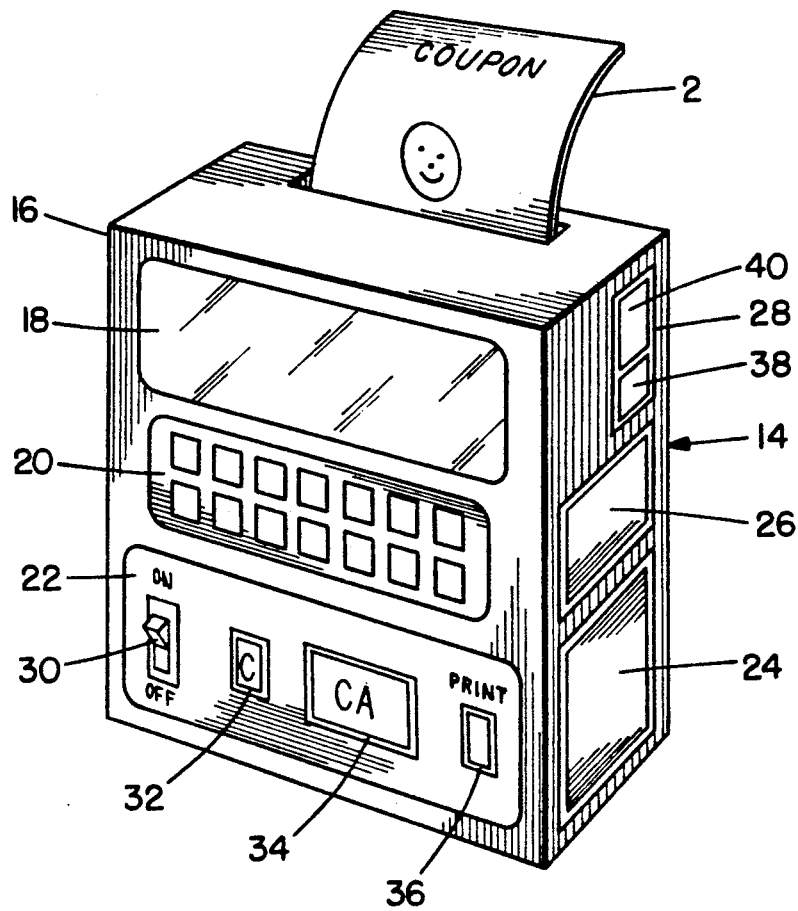
FIG. 2 is a perspective view of one embodiment of a generating unit incorporating features of the present invention.
Figure 4A:
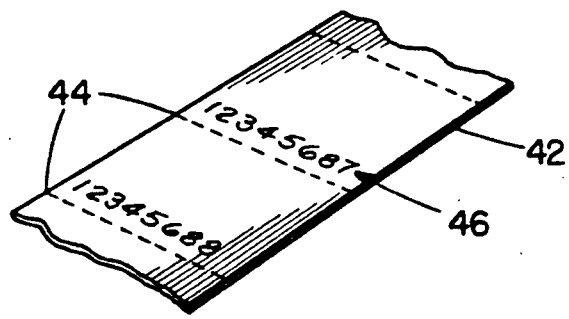
FIG. 4A is a perspective view of a matrix intended to be used as coupons generated from the generating unit shown in FIG. 2.
Figure 4B:
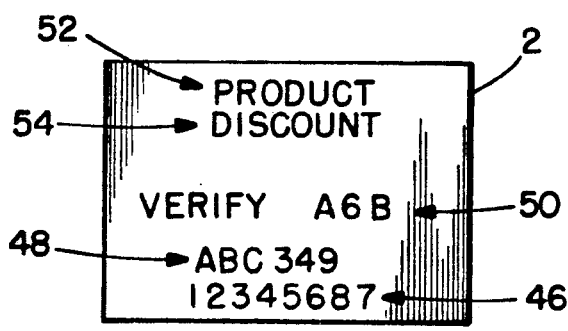
FIG. 4B is a front view of a coupon generated from the generating unit shown in FIG. 2.

Referring also to FIG. 2, each generating unit 14, in the preferred embodiment shown, generally comprises a housing 16, a display screen 18, input keys 20, control keys 22, a replaceable matrix unit 24, a replaceable printer unit 26, a replaceable memory unit 28, a battery power source (not shown), and an electronic controller (not shown). It should be understood that the description of this preferred embodiment of the generating unit 14 is only illustrative. Alternate embodiments of the generating unit may include additional or less features. The generating unit 14 need not have a battery power source, but may alternatively have an electrical cord (not shown) for attachment to a household electrical outlet. In the embodiment shown, the generating unit 14 is generally intended to generate coupons 2 printed on paper. However, it should also be understood that the invention is equally applicable to the creation of other types of tokens, such as magnetic cards. The display screen 18, in the embodiment shown, is an LCD screen and can display information input into input keys 20. However, in an alternate embodiment of the invention, the screen 18 need not be provided. The product information can be provided on a TV screen or, can be provided audiably on a voice channel frequency. The input keys or data entering section 20 permits a TV-viewer 13 to enter product information into the unit 14, such as product names and specifications of a product which the viewer intends to buy in the near future, and verification data. The control keys or control section 22, in the embodiment shown, generally comprise an on/off key 30, a clear key 32, a clear-all key 34, and a print activation key 36. The control keys are suitably connected to the electronic controller (not shown) which is, in turn, connected to the memory unit 28 and printer unit 26. The memory unit 28, in the embodiment shown, generally comprises a first memory section 38 and a second memory section 40. The first memory section 38 is intended to be used as a temporary memory for storing information input at input keys 20 until such time as one of the control keys 22 are used. The temporary memory section 38 has two separate portions, a first single item memory portion and a second single record memory portion. The single item memory portion is intended to store only one type of information at a time, such as product name, product size, or discount value, etc. The single record memory portion is intended to store information for a single record which includes product name, product size, discount value, and verification data, etc. The viewer 13 can input data or information at keys 20 which is stored in the single item memory portion until an enter key is depressed and the information can be transferred to the single record memory portion. Alternatively, the viewer 13 can depress the clear key 32 to delete the information in the single item memory portion, but not affect information in the single record memory portion. Information in the single record memory portion can either be deleted by depressing the clear-all button 34 or depressing the print button 36. If the viewer depresses the print button 36, in addition to printing a coupon 2, the generating unit 14 can also store the printed information in its second memory section 40 for purposes as described below. The cost of the generating unit 14 can be inexpensive because the unit requires no complicated installation, wiring or attachment. The keyboard used as an entry device is not elaborate and may resemble that of a telephone keypad with touch buttons. When the viewer has entered information into the unit and pressed the print key 36, the printer unit 26 advances a matrix 42 (see FIG. 4A) from the matrix unit 24, prints the information from the single record memory portion onto the matrix, and dispenses the matrix with printed information (a coupon) out of the housing 16. The printing can be accomplished with or without impact using ink sprays, applying heat, magnetic pulses, laser beams, other light sources, providing depressions, or embossed markings. Referring to FIG. 3, the viewer 13 can present the coupon 2 at a redemption center or sales outlet 3 for consideration such as reduction in the purchase price of a product 4 or a free prize 5. While at home, the viewer can select a product in which the viewer is interested and, can use and activate the generating unit so as to print a token or discount coupon specifying such product or merchandise. Normally, the coupon will have printed on it a product indicia line 52 and a discount information line 54 (see FIG. 4B). These product indicia and discount information lines can include coupon redemption information such as places available for redemption, time period for redemption, etc. The employee 15 at the redemption facility 3 can review or authenticate the product indicia line, discount information line, and any other recorded coupon redemption information to verify compliance with predetermined redemption requirements or limits before granting value consideration to the shopper 13. The employee 15 might authenticate by comparing the redemption information to a redemption listing or by entering the redemption information into a computer, such as by a keyboard or bar code reader, which would automatically compare the redemption information on the coupon to a redemption listing or database.

In the course of a television program, viewers can be informed of special sales, discounts, or promotional offers or events which make it attractive to a viewer to utilize coupons reflecting such offers. A number of methods to attract shoppers to sales outlets will now be described. For paper matrix 42 (see FIG. 4A), the matrix preferably has perforations 44, but these need not be provided if the generating unit 14 has a cutter to separate the printed coupon from the matrix. When desired, the matrix sections formed between the perforations 44 are premarked or prenumbered with indicia 46 suitable for use for verification or authentication purposes. However, this indicia 46 need not be provided or alternatively, may be provided by the generating unit 14. Thus, the coupons 2 generated and dispensed by the units 14 normally are prenumbered, such numbers being dissimilar. In an alternate embodiment, the indicia or code 46 may be provided as a machine-readable code. The code can also be provided from a group of markings consisting of numbers, letters, dots, dashes, regular and irregular shapes, codes, symbols and, discrete, connected, and continuous configurations. Utilizing this indicia 46, or parts thereof, an additional prize can be granted. An example would be a "blind" prize payable in cash or merchandise to a shopper who redeems one of the coupons in the course of the purchase of the discounted merchandise. If the indicia 46 on a coupon 2 matches indicia selected by the sponsor of the program, the shopper redeeming the coupon 2 is entitled to an additional prize 5. In a preferred embodiment, the shopper 13 will learn of such a "blind" prize having been won only upon the redemption of the coupon 2. Thus, the method will help to attract shoppers to stores to redeem coupons.

According to another embodiment, a code or "lucky" number 48 is originated by a member of the broadcast audience and shown on the token 2. This method of the invention permits an audience member to select his or her own "lucky" number in the hope that it will match the "lucky" number of the day selected by the sponsor and preferably ascertainable or discernible only upon redemption of the token 2.

In another embodiment, the transmitter or television station 10 also transmits verification data that must be entered into the generating unit 14 which is recorded on the coupon 2 as verification data or indicia 50. This verification indicia 50 can also be used to award "blind prizes". Thus, for example, a prize may be awarded to a shopper whose verification code 50 contains indicia specified and posted at a sales outlet 3 on the day of redemption. According to another method, the host of a TV-program can announce that coupons pertaining to a certain product "will carry a discount in excess of 20%". The shopper will not know how much larger than 20% the discount is until the coupon is redeemed.

The system also provides for a cumulative record being kept, if desired, by the generating unit 14 of all coupons requested by a member of the television audience. This record is compiled and retained in the generating unit in memory 40 and can be made available to sponsors of promotions in different ways. One method of making such coupon generation records available to a sponsor is by retrieving the recorded information from the generating unit 14 by a representative of the advertiser. A preferred method is to take advantage of the shoppers' need to periodically replenish the paper tapes or matrix unit 24 used to produce the coupons in the generating unit. Such paper tapes or matrix units 24 may be available to shoppers in retail stores or other redemption points and, when a shopper receives such a tape, the above mentioned purchase record may be collected from such shopper and made available to the sponsor.

The methods of the invention may permit a combination of measures to prevent forgeries and cheating. The matrix 42 may be of a special composition to make duplication difficult. If the token is to be a paper coupon, the coupons can be prenumbered or provided with other verifiable codes. Numbers or codes can also be transmitted from a central location, which numbers or codes replace or are in addition to the numbers or codes preprinted on the matrix 42. In order to prevent forging and counterfeiting, particularly of more valuable tokens, the token redemption terms can include alphanumeric and/or other indicia or symbols capable of authentication at a redemption center and can include a combination of two separate codes each capable of verification. For example, the information governing the redemption of a token can include a first verification code preprinted on a matrix and a second verification code entered into the generating unit by a shopper in accordance with information transmitted to shoppers by a TV station. The coupons may also have the user's identification preprinted thereon and, for larger prizes, a user may be asked to present identification at the time of redemption.

The system and method described above has the advantage that the generating unit 14 need not be programmed or controlled by external sources such as by electronic signals. The only electronic communication flow is from the central location to the TV-viewers, and the only information input into the generating unit is that entered by a TV-viewer on the input keys 20 or other entry device. The absence of two way communication significantly reduces capital investment and operating costs of the system. However, the system and method could be used with a two way communication system such as when the viewer communicates with the central transmitter station to indicate display or broadcast of product information on a specific product or group of products before using the unit 14 or during use of the unit.

The product information conveyed by electronic signals from a central location 10 may pertain to a single available product or to a plurality of available products, each accompanied by its specification, prize or discount information and, when desired, verification data. A member 13 of the broadcast audience can determine or select a product of interest at that time. If the product information conveyed relates to only one product, and the viewer 13 desires to obtain a token for that product, the user can enter the appropriate product information and verification data into the unit 14 and generate a token. If more than one product is available, the viewer can select the desired product or products and enter the information and data pertaining to the chosen merchandise or services into the unit 14. A single product may be available in different sizes or with different features and specifications in which event shoppers can select the size, feature or specification of their choosing. Alternatively, if the product is of no interest, the audience member may choose to disregard the offer of that product and, in effect, reject it by doing nothing. As used herein, the term "select" therefore is intended to apply also to the act of specifying a single available product for intended purpose, in addition to its more common meaning of selecting from a number of choices.

One method that can be employed may provide for a viewer to originate and specify a product from a class of products. The host of a TV-show may, for example, announce a special code and state that any coupon generated and bearing that code carries with it a predetermined amount of consideration or discount for a predetermined class of products, such as a discount of 30% on any household product. The special code can be combined with a verification code preprinted on the matrix to award large prizes. The combination of the two codes in a predetermined correlation to each other giving entitlement to the large prize. The viewer can generate such a coupon by specifying or entering into the unit a product of his or her own choosing, the announced discount, and the special code. In this manner, viewers can apply such discounts to products of their own choosing from a class of products. Random selection, or otherwise selecting codes in a controlled manner, can be used to give a "lucky" prize to a token redeemer similar to a sweepstakes or lottery with a "lucky" prize winner being ascertainable at either the viewer's remote location and/or a redemption facility.

Although the product specification can originate with the television viewer, the sponsor will frequently prefer to provide on the broadcast the names, prices and specifications of products available for prizes and discounts. In one of the methods, the host of a TV-program can state as part of the redemption terms for a token that a specified store or redemption center will grant a stipulated discount on an identified product or products within a limited period of time. Similar announcements can also be made part of a commercial or promotional message broadcast. The viewer can then select the product, related price or other information to generate a token. The verification or redemption data provided on the token can enable the redemption facility to reject coupons presented after the cutoff data or, coupons which are not for that facility.

The inducement of various kinds of "blind prizes" discernible only at the point of redemption and occasional sweepstake prizes, will ensure greater use and higher redemption rates of coupons. In addition to the product information, discount information and code numbers, the coupons can carry additional preprinted advertising and promotional messages. Advertisers can provide shoppers with predetermined numbers or codes for use in specifying specific products and product information, such as printed tables distributed at sales outlets or on the goods themselves or packaging of the goods. The viewer/shopper can then merely enter the abbreviated number or code for the selected product instead of the entire product information into the unit 14. Thus, a faster entry of product information can be provided.

Figure 5:
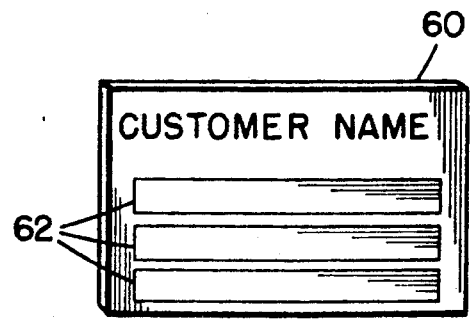
FIG. 5 is a perspective view of an alternate form of matrix to be used with an alternate embodiment of the generating unit shown FIG. 2.

Although the present invention has been primarily described above with reference to a paper matrix and printed paper coupons, FIG. 5 shows an alternate embodiment of a matrix/coupon. In the embodiment shown, the matrix 60 is comprised of a plastic card having magnetic type strips 62 thereon. The strips 62 can have product information and verification data magnetically recorded thereon which can be read by a suitable reader at the redemption center. For this type of matrix, the generating unit would obviously have a means for magnetically recording information onto the strips 62. Once the card 60 is used as a token it could be returned to the customer with the information on the magnetic strips 62 erased for further use in the future.

Figure 6:
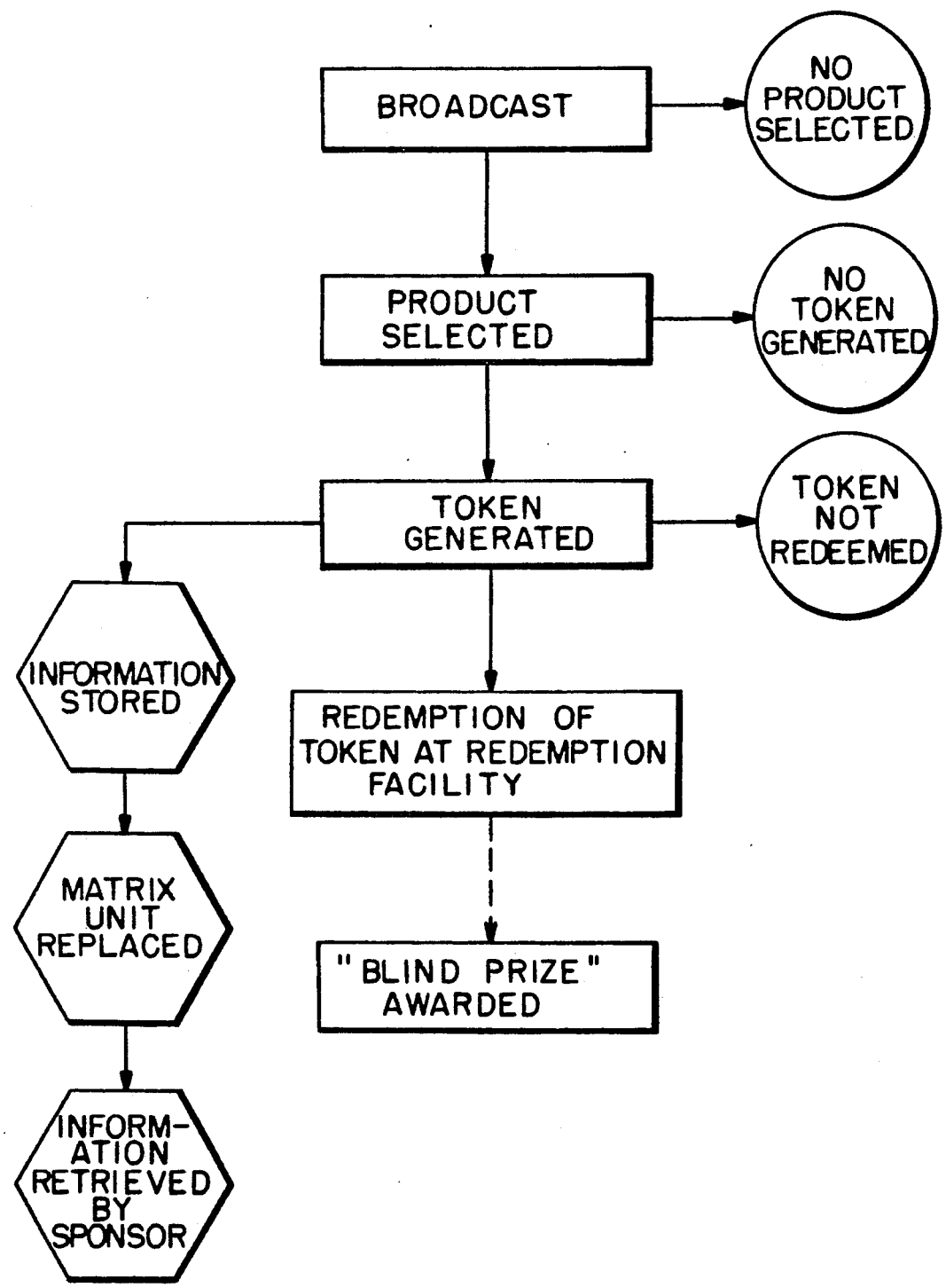
FIG. 6 is a flow diagram of one method of the present invention.

Referring now to FIG. 6, there is shown a flow diagram of one method of the present invention to help better understand the invention. After broadcast of product information, the viewer/shopper can either select or not select a product. If a product is selected, a token will only be generated by the viewer/shopper activating the printer by pressing the print button. Until the print button is pressed, no token is generated. Upon pressing the print button a token is generated and its information stored in a memory unit retrieved by the sponsor when the matrix unit is replaced. Once the token is generated, the viewer/shopper can redeem the token by taking it to a redemption facility. If indicia on the token matches predetermined special prize indicia selected by a sponsor, the viewer/shopper also is awarded a "blind prize" in addition to the token's value. The systems and methods described above lend themselves well to the kind of data collection useful to advertisers for the purpose of determining shopping patterns of TV viewers. A number of data collection methods will now be described.

The token generating units can be provided with individual serial numbers. When desired, the printer can be equipped with permanent means for printing a viewer/shopper's name on every coupon, thus providing additional and verifiable identification. When a unit is sold or leased to the member of a household who is a potential shopper, the identity of that individual for that unit can be recorded. Thus, the coupons dispensed by that generating unit can print the serial number on the coupon and be traced back to and associated with the individual or household. Over a period of time the buying habits or patterns of that shopper or household can emerge by reviewing the redeemed tokens. When a generating unit is to be placed in a household comprising several members, particulars of the entire family can thus be illicited and recorded.

In addition to the above method, an identification card containing the user's name and the serial number of the generating unit can also be issued to the individual who buys or leases the unit. This card may be required for presentation and authentication when a large or sweepstake prize is claimed. The aforementioned cumulative record of all coupons requested by and dispensed to a shopper also can be used to create a demographic database. If, for example, a paper tape forms the matrix for 100 coupons, a sponsor, upon receipt of the cumulative record, has a ready made list of purchases expressed in percent for each product category.

Another method of awarding a blind prize or additional prizes can include the situation when a token generated by the unit 14 and a preprinted coupon, such as those found in newspapers and the like, are both presented for redemption at a redemption facility. In this method of the invention, the token could have a first code and the preprinted coupon a second code, such as machine-readable bar codes. In the event that both codes match, or at least partially have a predetermined correlation, the viewer/shopper would be entitled to the additional prize or a blind prize. Another method might include using a preprinted coupon as the matrix for a token. This method would include giving consideration in the form of a prize and/or discount to a redeemer upon redemption of such a combined coupon/token including both the value of the preprinted coupon and the value of the product discount entered into the generating unit and printed on the preprinted coupon. An additional prize or consideration for such a combined coupon/token might also be given.

Another system and method might include the transmission or broadcast by the central station 10 of a machine-readable signal and providing the generating unit with means for reading the signal. This machine-readable signal can be transmitted concurrently with the normal audio and visual signals, such as during a television commercial. If the viewer desires to purchase the product being advertised or desires access to the specific product information being transmitted in the machine-readable signal, the viewer would only need to press a button on the generating unit; either a print button or a view button. The generating unit could then either print a token or display the product information. If the product information was merely displayed, the viewer can either clear the displayed product information if a token is not desired or, print a token for that product. Another method might include transmissions over an extra television channel or several television channels which constantly update listings of product information. It might also be possible for viewers to call up categories most to their desire such as detergent, furniture polish, etc.

Let it be understood that the foregoing description is only illustrative of the invention. Various alternatives and modifications can be devised by those skilled in the art without departing from the spirit of the invention. Accordingly, the present invention is intended to embrace all such alternatives, modifications and variances which fall within the scope of the appended claims.

What is claimed is:

1. A method for generating and redeeming tokens having value comprising the steps of:
   transmitting, from a central location to remote locations having potential shoppers, electronic program signals conveying product information regarding at least one product available for purchase, said product information including token redemption information and value consideration information, said value consideration information having information regarding value consideration available upon purchase of said product;
   receiving and presenting said signals at said remote locations;
   providing token generating units at said remote locations, said units comprising entering means for selectively entering, at least partially, said product information; means for storing entered information; a token matrix adapted to record information; and means for writing information stored in said means for storing on said matrix;
   entering, at least partially, at said entering means product information selected by a potential shopper regarding a product intended for purchase;
   storing said entered information in said token generating unit;

generating a token from said token generating unit by writing said entered information on said matrix and dispensing said token from said token generating unit to said potential shopper;

providing a redemption facility for redeeming said token;

presenting, by a shopper, said token at said redemption facility for redemption;

authenticating, by said redemption facility, token redemption information on said presented token; and making value consideration of an authenticated token available, by said redemption facility, to a presenter of the token upon purchase by the presenter of the product identified on the token.

2. The method according to claim 1 wherein said matrix is a card with a magnetic strip and the step of writing information on said matrix comprises magnetically writing information onto said strip.

3. The method according to claim 1 wherein said matrix is paper and the step of writing comprises printing information onto said paper.

4. The method according to claim 3 further comprising providing said paper with a preprinted code.

5. The method according to claim 4 wherein at least a portion of said code is provided as a machine-readable code.

6. The method according to claim 1, wherein the product information includes a discount applicable to a class of products and wherein the step of entering includes selecting a product from the class to which said value consideration is to be applied.

7. The method according to claim 1 further including the step of awarding an additional prize for redemption of a token bearing a blind code having a correlation to a code previously determined by a sponsor, the blind code including information written on said matrix by said unit.

8. A method as in claim 1 further comprising the step of transmitting verification data from said central location to said remote locations.

9. A method as in claim 1 further comprising the step of providing verification data on said token.

10. A method as in claim 9 wherein the step of providing verification data on said token includes entering verification data into said token generating unit and said token generating unit writing said verification data on said token.

11. A method as in claim 1 wherein the step of authenticating comprises comparing coupon redemption information written on said token to a redemption listing at said redemption facility.

12. A method as in claim 1 further comprising:
providing a first code on a preprinted coupon;
providing a second code on said matrix at a remote location during the step of generating the token;
presenting the preprinted coupon and the token simultaneously at the redemption facility; and
presenting an additional prize to a shopper presenting the preprinted coupon and the generated token upon the occurrence of the first and second codes having a predetermined correlation.

13. A method as in claim 1 wherein said matrix is plastic and the step of writting information on said matrix comprises writting information on said plastic.

14. A system for generating redeemable tokens at remote locations of members of a broadcast audience, said system comprising:

broadcast means at a central location for transmitting electronic program signals including product information;

means at said members' locations for receiving and presenting said program signals;

token generating units at said members' locations, each unit comprising:

a housing;

means, operable by individual ones of said members and connected to said housing, for selectively entering product information into a means for storing entered product information;

a matrix removable connectable to said housing and adapted to record information thereon;

token generating means connected to said means for selectively storing entered product information, said token generating means including means for recording at least a portion of selectively entered product information on said matrix upon activation of said generating means; and means, operable by a member of said audience, for activating said generating means to record said selected product information on said matrix to create a generated token.

15. The system according to claim 14 wherein said matrix is a magnetic card.

16. The system according to claim 14 wherein said matrix is a paper.

17. The system according to claim 14 wherein said generating unit includes means for storing a separate cumulative record of product information previously recorded onto tokens generated by said unit.

18. A system as in claim 14 wherein said means for entering is adapted to enter token redemption information into said buffer storage means and, wherein said token generating means is adapted to write said token redemption information on said matrix.

19. A system as in claim 14 wherein said means for entering is adapted to enter verification data into said buffer storage means and, said token generating means is adapted to write said verification data on said matrix.

20. The system as in claim 14 wherein said token generating units comprise means for recording on said matrix a code transmitted from said central location.

21. The system as in claim 14 wherein said token generating means include means for recording a cumulative compilation of entered product information.

22. A method as in claim 14 wherein said matrix is plastic.

23. A system as in claim 17 wherein said generating unit includes means for compiling said separate cumulative record.

24. A method for increasing the redemption rate of discount coupons comprising steps of:

transmitting, from a central location, electronic signals conveying product information, said product information including a product description, value information, and coupon redemption information;

receiving and presenting said signals at remote locations of individual shoppers;

providing, at said remote locations of individual shoppers, a coupon generating unit selectively operable by said shoppers, said coupon generating unit having means for generating coupons comprising product information selected by individual shoppers;

entering at least a portion of said product information by a shopper into said coupon generating unit;

generating, upon activation of a shopper, a coupon from said generating unit in response to a shopper's selective entry of product information into said coupon generating unit, said coupon having the selected product information thereon; and giving value consideration to a shopper upon redemption of said coupon and purchase of the selected product identified on said coupon.

25. A method for determining the shopping pattern of TV-viewers, the method comprising steps of:

transmitting, from a central location, electronic signals conveying product information, said product information including a product description, value information, and coupon redemption information;

receiving and presenting said signals at remote locations of individual shoppers;

providing at the remote locations of individual shoppers, a coupon generating unit selectively operable by said shoppers, said coupon generating unit having means for generating coupons and means for compiling a cumulative record of coupons generated by said generating unit;

entering at least a portion of said product information by a shopper into said coupon generating unit;

generating, upon activation by a shopper, a coupon from said generating unit at said shopper's remote location, said coupon having at least a portion of said entered product information thereon;

compiling, in said coupon generating unit, a cumulative record of coupons generated by said generating unit;

giving value consideration to a shopper upon redemption of said coupon and purchase of a product identified on said coupon at a redemption location; and collecting each of said cumulative records of said generating units and making said cumulative records of said generating units available to a sponsor or advertiser.

26. A method as in claim 25 wherein said cumulative record is a hard copy record.

27. The method as in claims 24 or 25 wherein the step of generating includes providing information on the coupon to identify the shopper activating the generating unit.

28. The method as in claim 27 further comprising the step of determining buying patterns of shoppers by review of redeemed coupons.

29. A method for determining the shopping pattern of individual members of a broadcast audience, the method comprising steps of:

(a) a first group of steps comprising:
providing, at remote locations of individual shoppers, a coupon generating unit selectively activatable by said shoppers, said coupon generating unit having means for generating coupons, said coupons having value and having product information, selected by individual shoppers, identified thereon;

generating, upon activation of said generating unit by a shopper, a coupon from said generating unit in after a shopper's selective entry of product information into said coupon generating unit, said coupon having value and having identified thereon said selected product information; and giving value consideration to a shopper upon redemption of said coupon and purchase of a selected product identified on said coupon; and (b) a second group of steps comprising:
providing at said remote locations of individual shoppers means for compiling a cumulative record of product information identified on said coupons;

compiling a cumulative record of an individual shopper's selected product information at said remote locations; and making said compiled cumulative record available to a sponsor by said individual shopper.

30. A method for determining the shopping pattern of members of a broadcast audience, the method comprising steps of:

transmitting, from a central location, electronic signals conveying product information, said product information including a product description, value information, and coupon redemption information;

receiving and presenting said signals at remote locations of individual shoppers;

providing, at the remote locations of individual shoppers, a coupon generating unit operable by said shoppers, said coupon generating unit having means for selectively generating coupons and means for compiling a cumulative record of coupons generated by said generating unit;

entering at least a portion of said product information by a shopper into said coupon generating unit;

selectively generating, upon activation by a shopper, individual coupons from said generating unit at said shopper's remote location, said coupon having at least a portion of said entered product information thereon;

compiling, in said coupon generating unit, a cumulative record of individual coupons generated by said generating unit;

giving value consideration to a shopper upon redemption of said individual coupons and purchase of products identified on said coupons at a redemption location by said shopper; and surrendering said cumulative records, compiled by said generating units, to a sponsor.

31. A method for making a cumulative record of intended purchases of individual shoppers available to sponsors comprising steps of:

transmitting, from a central location, electronic signals conveying product information, said product information including a product description, value information, and coupon redemption information;

receiving and presenting said signals at remote locations of individual shoppers;

providing, at remote locations of individual shoppers, a coupon generating unit operable by said shoppers, said coupon generating unit having means for selectively generating coupons and means for compiling a cumulative record of coupons generated by said generating unit;

entering at least a portion of said product information by a shopper into said coupon generating unit;

selectively generating, upon activation by a shopper, a product specific coupon from said generating unit at said shopper's remote location;

disengaging said coupon from said generating unit to said shopper;

compiling, at said shopper's remote location, a cumulative record of said generated coupons; and delivering information regarding said cumulative record to a sponsor.

32. A method of creating a marketing data base comprising steps of:

permitting individual members of a remote broadcast audience who are shoppers to specify products targeted for purchase by providing to said members a coupon generating unit having product entry means;

entering, by a member, a product specification into said member's coupon generating unit;

generating a coupon from said generating unit in response to said step of entering, said coupon having value consideration available upon purchase of said specified product and redemption of said coupon; and compiling, in said coupon generating unit, a cumulative record of products targeted for purchase by said individual member to thereby create a data base that can be collected for each individual member and used to establish a marketing data base.

33. The method according to claims 29, 30, 31 or 32 wherein said step of compiling comprises a plurality of recording steps, each recording step occurring each time a shopper activates said coupon generating unit.

34. The method according to claims 29, 30, 31 or 32 wherein said step of entering product information includes storing said product information in a memory of said coupon generating unit.

35. The method as in claims 29, 30, 31 or 32 further comprising analyzing a plurality of said cumulative records and thereby determining buying patterns of shoppers.

36. The method as in claims 29, 30, 31 or 32 further comprising a step of substantially simultaneously removing said cumulative record form said generating unit as a coupon matrix is being replenished in said generating unit.

37. The method as in claims 29, 30, 31 or 32 further comprising a step of storing said cumulative record at said shopper's remote location until retrieved by a sponsor.

38. The method as in claims 29, 30, 31 or 32, further comprising providing identification of a shopper on said shopper's cumulative record.

39. The method as in claim 30, wherein said step of surrendering said cumulative record includes said cumulative record being physically transported by said shopper to said sponsor in person.

40. The method as in claim 30, wherein said step of surrendering said cumulative record includes said cumulative record being mailed by said shopper to said sponsor.

* * * * *